United States Patent
Linde et al.

(10) Patent No.: US 11,322,810 B2
(45) Date of Patent: May 3, 2022

(54) JACKETING OF STRUCTURAL BATTERIES

(71) Applicant: AIRBUS OPERATIONS GMBH, Hamburg (DE)

(72) Inventors: Peter Linde, Buxtehude (DE); Maciej Wysocki, Mölndal (SE)

(73) Assignee: Airbus Operations GmbH, Hamburg (DE)

(*) Notice: Subject to any disclaimer, the term of this patent is extended or adjusted under 35 U.S.C. 154(b) by 705 days.

(21) Appl. No.: 16/145,538

(22) Filed: Sep. 28, 2018

(65) Prior Publication Data

US 2019/0097184 A1   Mar. 28, 2019

(30) Foreign Application Priority Data

Sep. 28, 2017 (DE) ............... 10 2017 122 564.1

(51) Int. Cl.
*H01M 10/052* (2010.01)
*H01M 4/58* (2010.01)
(Continued)

(52) U.S. Cl.
CPC ......... *H01M 50/557* (2021.01); *H01M 4/362* (2013.01); *H01M 4/5825* (2013.01); *H01M 4/625* (2013.01); *H01M 4/70* (2013.01); *H01M 10/049* (2013.01); *H01M 10/0436* (2013.01); *H01M 10/052* (2013.01);
(Continued)

(58) Field of Classification Search
CPC .. H01M 4/806; H01M 50/116; H01M 50/124; H01M 50/24; H01M 50/446; H01M 50/449; H01M 10/0436; H01M 10/049; H01M 10/052; H01M 10/0525; H01M 10/058; H01M 2220/20; H01M 4/362;
(Continued)

(56) References Cited

U.S. PATENT DOCUMENTS 7,855,017 B1* 12/2010 Snyder .............. H01M 10/0565
429/304
9,276,240 B2  3/2016 Shinyashiki et al.
(Continued)

FOREIGN PATENT DOCUMENTS

CN    101 409 371 A     4/2009
DE  10 2011 005403 A1   6/2012
(Continued)

OTHER PUBLICATIONS

Machine translation of Korean Patent Publication No. KR 101772446, published Aug. 28, 2017. (Year: 2017).*
(Continued)

*Primary Examiner* — Stewart A Fraser
*Assistant Examiner* — Lilia Nedialkova
(74) *Attorney, Agent, or Firm* — Jenkins, Wilson, Taylor & Hunt, P.A.

(57) ABSTRACT

A battery with a layers including a first layer which is electrically conductive, a second layer consisting essentially of carbon-fiber-reinforced plastic, a third layer of glass-fiber-reinforced plastic, a fourth layer of carbon-fiber-reinforced plastic and LiFePO$_4$, where the ratio by weight of LiFePO$_4$ to carbon fiber is from 2:1 to 2.5:1, and a fifth layer which is electrically conductive, wherein the battery has substantially been jacketed by a layer made of glass-fiber-filled polyester.

9 Claims, 1 Drawing Sheet

(51) Int. Cl.

| | |
|---|---|
| *H01M 4/62* | (2006.01) |
| *H01M 4/36* | (2006.01) |
| *H01M 50/24* | (2021.01) |
| *H01M 50/116* | (2021.01) |
| *H01M 50/124* | (2021.01) |
| *H01M 50/446* | (2021.01) |
| *H01M 50/449* | (2021.01) |
| *H01M 10/04* | (2006.01) |
| *H01M 10/0525* | (2010.01) |
| *H01M 10/058* | (2010.01) |
| *H01M 50/557* | (2021.01) |
| *H01M 4/70* | (2006.01) |

(52) U.S. Cl.
CPC ..... *H01M 10/058* (2013.01); *H01M 10/0525* (2013.01); *H01M 50/116* (2021.01); *H01M 50/124* (2021.01); *H01M 50/24* (2021.01); *H01M 50/446* (2021.01); *H01M 50/449* (2021.01); *H01M 2220/20* (2013.01)

(58) Field of Classification Search
CPC ...... H01M 4/5825; H01M 4/625; H01M 4/70; Y02P 70/50; Y02E 60/10
See application file for complete search history.

(56) References Cited

U.S. PATENT DOCUMENTS

| | | | |
|---|---|---|---|
| 2012/0103714 A1 | 5/2012 | Choi et al. | |
| 2012/0214375 A1* | 8/2012 | Kitano | H01M 4/133 442/336 |
| 2015/0180086 A1* | 6/2015 | Asp | H01M 10/0525 429/306 |
| 2018/0040912 A1* | 2/2018 | Chang | H01G 11/82 |

FOREIGN PATENT DOCUMENTS

| | | |
|---|---|---|
| DE | 10 2011 087003 A1 | 5/2013 |
| EP | 3 018 755 A1 | 5/2016 |
| KR | 101 772 446 B1 | 8/2017 |
| WO | WO 2013/068165 A1 | 5/2013 |

OTHER PUBLICATIONS

Liu, P. et al. "Design and fabrication of multifunctional structural batteries", Journal of Power Sources, vol. 189, pp. 646-650, published Oct. 1, 2008. (Year: 2008).*

Leijonmarck, S. et al. "Solid polymer electrolyte-coated carbon fibres for structural and novel micro batteries", Composites Science and Technology, 89, pp. 149-157, published Oct. 17, 2013. (Year: 2013).*

Yu, Y. et al. "Multifunctional structural lithium ion batteries based on carbon fiber reinforced plastics composites", Composites Science and Technology, 147, pp. 62-70, published Apr. 26, 2017. (Year: 2017).*

German Search Report for German Application No. 10 2017 122 564.1 dated Aug. 3, 2018.

European Search Report for Application No. 18197253.0 dated Mar. 1, 2019.

* cited by examiner

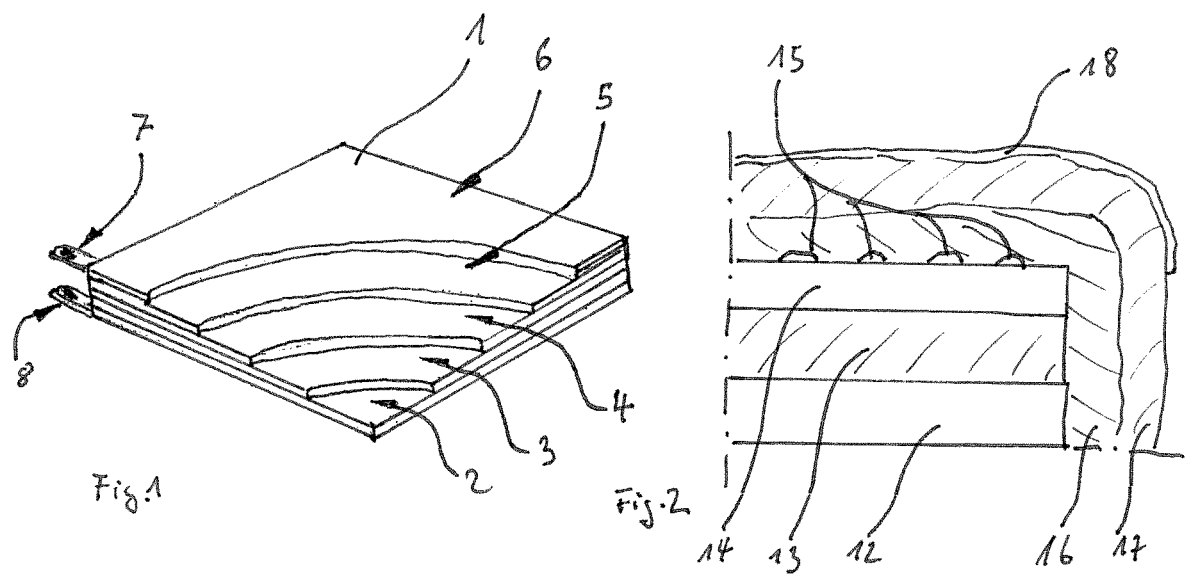
Fig. 1
Fig. 2
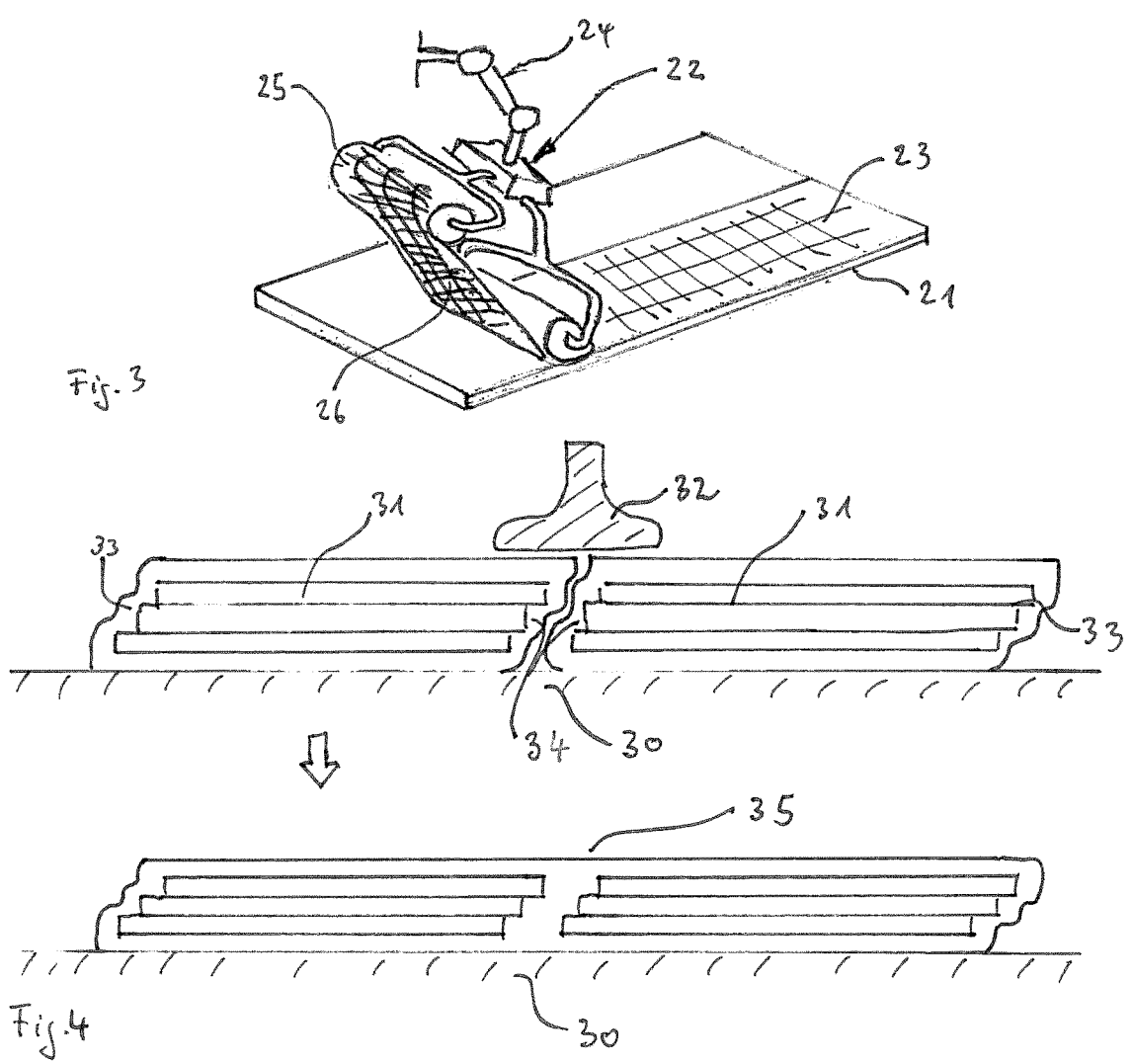
Fig. 3
Fig. 4

JACKETING OF STRUCTURAL BATTERIES

CROSS-REFERENCE TO RELATED APPLICATION

This application claims priority to German Patent Application DE 10 2017 122 564.1 filed Sep. 28, 2017, the entire disclosure of which is incorporated by reference herein.

TECHNICAL FIELD

The disclosure herein relates to structural batteries, in particular structural batteries for vehicle construction, in particular structural batteries for aircraft construction or for space travel, or for use in a vehicle, and in particular in an aircraft or a spacecraft. The disclosure herein further relates to a process for the production of structural batteries.

BACKGROUND

In many vehicles, in particular in air travel or space travel, stringent requirements are placed on energy storage density of energy storage devices, i.e. the intention is to maximize the electrical energy that can be stored per unit of weight of the energy storage device. The expression energy storage devices can by way of example mean batteries, preferably rechargeable batteries, for example for use in electrical vehicles or hybrid vehicles. Energy storage density (or energy density) is measured by way of example in watt hours per kilogram (Wh/kg).

Batteries comprise an anode, a cathode and an electrolyte into which both electrodes are immersed. These together form a cell. There are also batteries consisting of a combination of a plurality of cells. There is often a separating layer (separator) separating anode and cathode from one another. Batteries can comprise solid, liquid or polymeric electrolytes. They can moreover be designed to be rechargeable. A characteristic common to most batteries is that they have a relatively low charge-to-mass ratio, and this means that transport of large amounts of electrical power requires heavy batteries. There have therefore been many attempts to minimize the weight and size of batteries, for example by using lightweight polymer-based electrodes. Another idea was to develop batteries with additional functions, known as multifunctional batteries. This type of additional function is provided if by way of example the battery simultaneously has a load-bearing function. Another term used for these batteries with additional load-bearing properties is structural batteries. Another term sometimes used for these is laminated electrical energy storage system.

The document U.S. Pat. No. 9,276,240 B2 describes a flat, laminated battery arrangement which has side faces smaller than its front faces.

SUMMARY

Starting from this known prior art, one of the objects of the disclosure herein is to provide an improved laminated energy storage system, in particular an energy storage system with higher energy density.

In a complete surprise to the person skilled in the art, it has now been found that the disadvantages of the prior art are overcome via a battery with a plurality of layers comprising a first layer, which is electrically conductive, a second layer, consisting essentially of carbon-fiber-reinforced plastic, a third layer of glass-fiber-reinforced plastic, a fourth layer of carbon-fiber-reinforced plastic and of $LiFePO_4$, where the ratio by weight of $LiFePO_4$ to carbon fiber is from 2:1 to 2.5:1, and a fifth layer, which is electrically conductive, wherein the battery has substantially been jacketed by a layer made of glass-fiber-filled polyester. These batteries have load-bearing properties and are also termed structural batteries. Glass-fiber-filled polyesters used can preferably be PET, PBT, or PEI. There can moreover be 15% by weight of $CF_3SO_3Li$ (Li triflate) in an electrolyte solution in this structural battery. It is preferable here that the electrically conductive material of the first and/or of the fifth layer is selected to be metal or graphene. It is preferable here that the jacketing layer made of glass-fiber-filled polyester has substantially been coated with metal and/or ceramic on the side facing away from the battery. A ceramic layer of this type is watertight, and in particular thermoplastics filled with clay minerals are suitable, preference being given to polypropylene. Another term used for these materials is clay-polymer composites or clay-PP composites. It is preferable here that the jacketing layer made of glass-fiber-filled polyester comprises woven glass-fiber fabric. It is preferable here that the jacketing layer made of glass-fiber-filled polyester has been coated with $SiO_2$ on the side facing away from the structural battery. The $SiO_2$ can be applied by plasma coating, CVD or PVD. It is preferable here that the arrangement of the edges of the first to fifth layer is stepped. It is thus possible to bond the individual structural batteries to one another. A tongue-and-groove configuration of the edges is also suitable. The disclosure herein also comprises a process for the production of a battery, wherein the first and fifth layer, and also the jacketing layer, are positioned via AFP or ATL and are consolidated via laser or ultrasound welding, and also comprises a component having, over a large area, a plurality of structural batteries of the disclosure herein and in which individual structural batteries have been bonded to one another at their edges. It is preferable here that a heated press has been used to bond the bonded structural batteries.

The aspects described above, and other aspects, features and advantages of the disclosure herein, can also be found in the examples of the embodiments which are described below with reference to the attached drawings.

BRIEF DESCRIPTION OF THE DRAWINGS

In the Example Drawings:

FIG. 1 shows a conventional structural battery;

FIG. 2 shows a structural battery of the disclosure herein, and also jacketing around the same;

FIG. 3 shows how a structural battery can be coated with jacketing of the disclosure herein, with use of an applicator machine; and FIG. 4 shows how a plurality of structural batteries can be positioned on a surface and bonded to one another.

The figures use identical reference signs for elements, components or aspects that are identical or at least similar. Attention is drawn to the fact that embodiments described in detail below are merely illustrative and are not restrictive.

DETAILED DESCRIPTION

FIG. 1 shows a conventional structural battery (1). This is characterized by a layer structure. An anode made of carbon-fiber-composite material (3) has been applied onto a large surface area of a collector (2) configured with large surface area. Adjacent to the anode, there is a separating layer composed of glass-fiber-reinforced plastic, this separator (4) being followed by a cathode (5). The cathode (5) consists of or comprises carbon-fiber-reinforced plastic, the surface of which has been doped with lithium iron phosphate. This is followed by a further collector layer (6). A connector (7) has been secured on the cathodic collector layer (6), and there is likewise a connector (8) attached to the anodic collector layer (2). The connectors allow extraction of electrical power from the structural battery and connection to a load.

FIG. 2 shows a structural battery of the disclosure herein, and also jacketing around the same.

The underside and upper side of the anodic and cathodic collectors in the form of an electrically conductive medium can have been printed onto conventionally superposed anode, cathode and separator layer. The collectors have been bonded to connectors which allow connection of the battery to an electrical load, and extraction of charge. The battery is jacketed by a first layer (16) made of glass-fiber-reinforced thermoplastic. Thermoplastic used can be polyethylene terephthalate, polybutylene terephthalate or polyesterimide. The embedded glass fibers can be short fibers, long fibers, woven fabrics or nonwoven. This first layer (16) protects the battery from mechanical effects and insulates same electrically from the environment. Following the first layer, and surrounding same, there is a second layer (17), which has the function of protecting the battery from moisture or chemical effects from the environment. This uses a mixture of plastic and clay minerals. This mixture has thermoplastic properties and can provide protection from the media by virtue of its content of clay minerals, which swell on contact with water. A further layer (18) is applied onto the surface of the second layer (17), and consists of or comprises silicon dioxide. This layer can be applied by plasma desorption or CVD, and protects the structural battery from scratching and erosion. The composite made of the layers (16), (17) and (18) can protect the battery from adverse mechanical, electrical, and thermal effects.

FIG. 3 shows how a structural battery (21) can be coated with jacketing (23) of the disclosure herein, with the use of an applicator machine (22).

An applicator machine (22) can by way of example be a tape-layer or a fiber-placement machine. A tape layer allows defined application of tapes on a surface. The width of the tapes can by way of example be from 5 to 50 cm. They can be processed in the form of roll product, and can have adhesive properties that can prevent slippage of the applied tapes. Fiber-placement machines differ in essence via the smaller width of the applied tapes: this can be from 5 mm to 5 cm. The jacketing (23) can be applied on the actual structural battery by an applicator machine (22). The applicator machine (22) has a robot (24) which allows movement of the applicator head in the desired direction and into the desired position. An applicator machine (22) moreover comprises a roll with thermoplastic protective film (25). With thermoplastic protective film (25) it is also possible to apply, onto the structural battery (21), conductor tracks printed onto the protective film itself and forming the cathodic or anodic collector (26) of the structural battery. This applicator machine (22) permits high-speed coating of structural batteries (21) with jacketing (23) of the disclosure herein.

FIG. 4 shows how a plurality of structural batteries (31) can be positioned on a surface (30) and can be bonded to one another. For this, the edge (33) of the structural battery (31) must have a stepped or tongue-and-groove configuration. This allows interlocking of a plurality of battery cells (31). Thermoplastically configured jacketing of the battery can be melted by a heated press (32) positioned across the bonding locations (34) of the various batteries (31); the cells can thus be bonded to one another. A plurality of bonded battery cells (35) respectively electrically separated from one another is thus provided. It is thus possible by way of example to provide structural batteries to a large area of the surface of an aircraft.

Although the disclosure herein has been illustrated and described in detail in the drawings and the preceding description, those illustrations and descriptions are intended to be no more than illustrations or examples, and not to be restrictive, and the disclosure herein is therefore not restricted by the embodiments disclosed. In the claims, the word "having" does not exclude other elements, and the indefinite article "a/an" does not exclude a plurality.

Mention of particular features in different dependent claims does not in itself restrict the subject matter of the disclosure herein. Combinations of those features can also be advantageously used. The reference signs in the claims are not intended to restrict the scope of the claims.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Structural battery
2 Anodic collector
2 Anode
4 Separator
5 Cathode
6 Cathodic collector
7, 8 Connection
12 Anode
13 Separator
14 Cathode
15 Collector
16 Layer made of glass-fiber-reinforced thermoplastic
17 Layer made of thermoplastic with clay minerals
18 Silicon dioxide coating
21 Structural battery
22 Applicator machine
23 Jacketing
24 Robot
25 Roll with thermoplastic protective film
26 Collector
30 Surface
31 Plurality of structural batteries
32 Heated press
33 Edge of structural batteries
34 Bonding locations
35 Bonded battery cells

The invention claimed is:
1. A battery with a plurality of layers comprising:
a first layer, which comprises an electrically conductive material;

a second layer arranged on the first layer and consisting essentially of carbon-fiber-reinforced plastic;

a third layer arranged on the second layer, such that the second layer is positioned between the first layer and the third layer, and comprising glass-fiber-reinforced plastic;

a fourth layer arranged on the third layer, such that the third layer is positioned between the second layer and the fourth layer, and comprising carbon-fiber-reinforced plastic and $LiFePO_4$, where a ratio by weight of $LiFePO_4$ to carbon fiber is from 2:1 to 2.5:1, a fifth layer, which is arranged on the fourth layer and comprises an electrically conductive material; and a jacketing layer made of glass-fiber-filled polyester that jackets the battery.

2. The battery according to claim 1, wherein the electrically conductive material of the first and/or of the fifth layer is metal or graphene.

3. The battery according to claim 1, wherein the jacketing layer made of glass-fiber-filled polyester is substantially coated with metal and/or ceramic on a side facing away from the battery.

4. The battery according to claim 1, wherein the jacketing layer made of glass-fiber-filled polyester comprises woven glass-fiber fabric.

5. The battery according to claim 1, wherein the jacketing layer made of glass-fiber-filled polyester is coated with $SiO_2$ on a side facing away from the battery.

6. The battery according to claim 1, wherein an arrangement of edges of the first to fifth layer is stepped.

7. A process for producing a battery, comprising:
providing a battery with a plurality of layers comprising:
a first layer which comprises an electrically conductive material;
a second layer arranged on the first layer and consisting essentially of carbon-fiber-reinforced plastic;
a third layer arranged on the second layer, such that the second layer is positioned between the first layer and the third layer, and comprising glass-fiber-reinforced plastic;
a fourth layer arranged on the third layer, such that the third layer is positioned between the second layer and the fourth layer, and comprising carbon-fiber-reinforced plastic and $LiFePO_4$, where a ratio by weight of $LiFePO_4$, to carbon fiber is from 2:1 to 2.5:1; and
a fifth layer which is arranged on the fourth layer, and comprises an electrically conductive material; and
forming a layer made of glass-fiber-filled polyester that jackets the battery;
wherein the first layer, the fifth layer, and the jacketing layer are positioned via AFP or ATL and are consolidated via laser or ultrasound welding.

8. A component comprising:
a plurality of batteries that each have a plurality of layers and are provided over an area of the component, bonded to one another at their edges, and each comprise:
a first layer, which comprises an electrically conductive material;
a second layer arranged on the first layer and consisting essentially of carbon-fiber-reinforced plastic;
a third layer arranged on the second layer, such that the second layer is positioned between the first layer and the third layer, and comprising glass-fiber-reinforced plastic;
a fourth layer arranged on the third layer, such that the third layer is positioned between the second layer and the fourth layer, and comprising carbon-fiber-reinforced plastic and $LiFePO_4$, where a ratio by weight of $LiFePO_4$ to carbon fiber is from 2:1 to 2.5:1;
a fifth layer, which is arranged on the fourth layer and comprises an electrically conductive material; and
a jacketing layer made of glass-fiber-filled polyester that jackets the battery.

9. The component according to claim 8, where the bonded batteries are heat press bonded.

* * * * *